Dec. 3, 1963 A. DRITZ 3,112,496
BELT WITH CORRUGATED FASTENING MEANS
Filed Jan. 17, 1962 3 Sheets-Sheet 1
FIG. 1
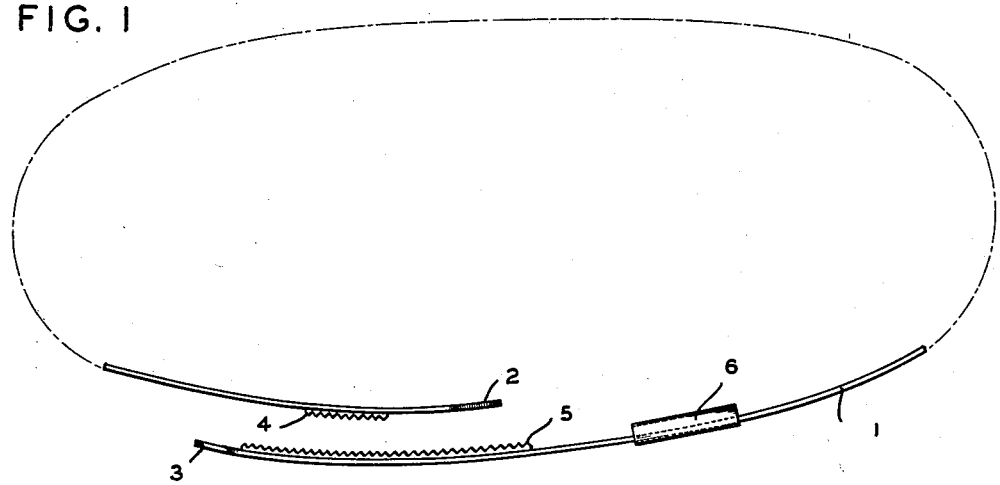
FIG. 2
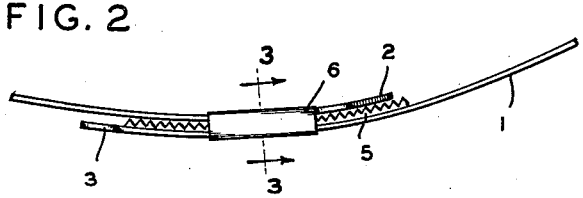
FIG. 3
FIG. 4
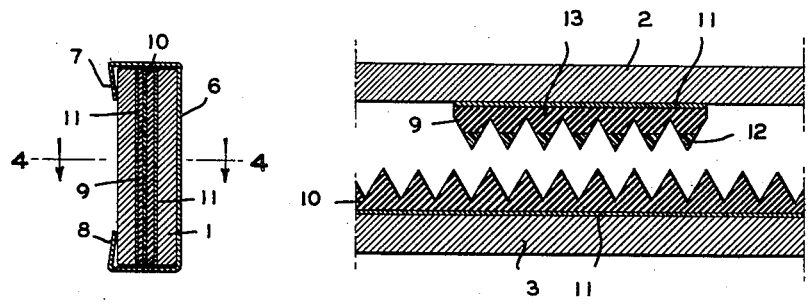
INVENTOR.
Arthur Dritz
BY
Sol Shappirio
ATTORNEY Dec. 3, 1963 A. DRITZ 3,112,496
BELT WITH CORRUGATED FASTENING MEANS
Filed Jan. 17, 1962 3 Sheets-Sheet 2
FIG. 5
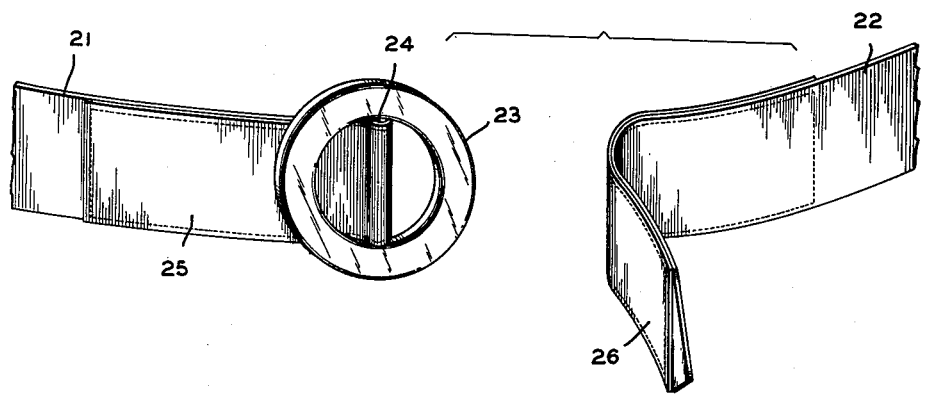
FIG. 6
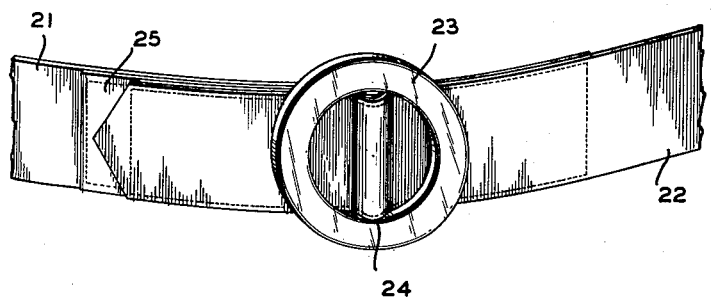
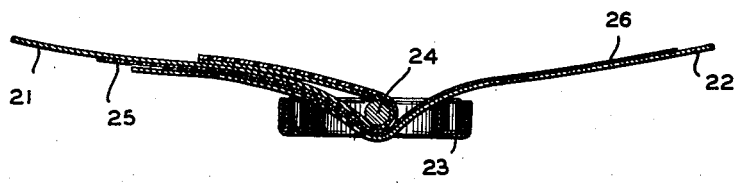
FIG. 7
INVENTOR
Arthur Dritz
BY Sol Shappirio
ATTORNEY Dec. 3, 1963                A. DRITZ                3,112,496
BELT WITH CORRUGATED FASTENING MEANS
Filed Jan. 17, 1962                    3 Sheets-Sheet 3
FIG. 8
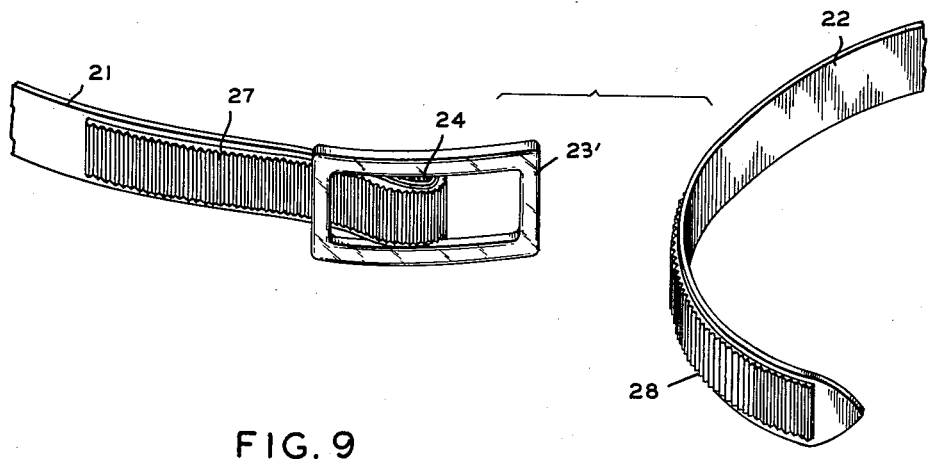
FIG. 9
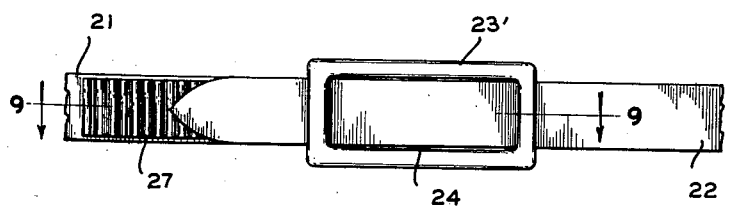
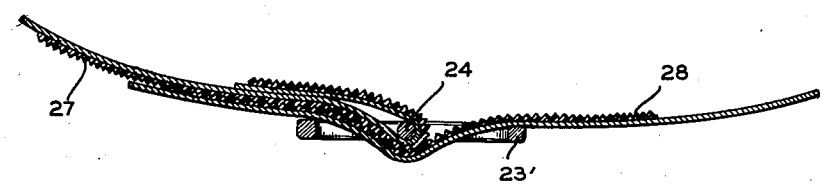
FIG. 10
INVENTOR.
Arthur Dritz
BY
Sol Shappirio
ATTORNEY

United States Patent Office 3,112,496
Patented Dec. 3, 1963

3,112,496
BELT WITH CORRUGATED FASTENING MEANS
Arthur Dritz, 1115 Broadway, New York, N.Y.
Filed Jan. 17, 1962, Ser. No. 166,965
4 Claims. (Cl. 2—322)

This invention relates to belts and related articles for personal wear or non-personal use in which securing means are utilized to fasten end elements together securably but releasably, and is a continuation-in-part of application Serial No. 844,743, filed October 6, 1959.

There are a variety of belt fastening devices in the prior art. The most common, perhaps, is that where a buckle is employed with a tongue element that may be positioned in any of a series of perforations in the other end of the belt. This does not permit adjustment in intermediate positions, or positions beyond the perforations, and also is time-consuming in adjustment. Other types include frictional containing elements which however usually permit sliding action under tension. Other forms are legion but suffer from one defect or another.

The present invention provides a fastening device of simple structure that may be readily adjusted to desired position at any points along a substantial length of flat flexible material while still adhering securely until positively released.

Other and further objects will appear from the more detailed description given below to illustrate the invention but is not limited to such specific forms, since various changes therein may be made without departing from the scope and spirit of this invention.

In that connection the drawings show the following:

FIGURE 1 represents a top plan view of a belt the ends of which carry a fastening device having intermeshing corrugated elements.

FIGURE 2 shows a fragmentary plan view of the fastening device of FIGURE 1.

FIGURE 3 shows a cross sectional detail along line 3—3 of FIGURE 2.

FIGURE 4 shows a longitudinal sectional view along line 4—4 of FIGURE 3.

FIGURE 5 shows another form in exploded view of belt or similar ends in which one end carries a buckle member with which the other end interlaces into fastening position.

FIGURE 6 shows a front elevation of the belt ends of FIGURE 5 in releasable interlocking position.

FIGURE 7 is a longitudinal sectional view through FIGURE 6.

FIGURE 8 is a top plan view of belt the ends of which carry a fastening device having intermeshing corrugated elements, one end carrying a buckle member with which the other end interlaces into fastening position.

FIGURE 9 shows a front elevation of the belt ends of FIGURE 8 in releasable interlocking position.

FIGURE 10 is a longitudinal sectional view through FIGURE 9.

The present invention provides a structure for securing ends of flat flexible elements together in contiguous but releasable position for fastening them together, and are well illustrated by belts and related devices. But other band type articles particularly for articles of clothing may be similarly treated to make use of the present invention such as garters, sleeve bands etc. Equally useful are two such ends of flat elements to be fastened together when they are not ends of a continuous encircling or embracing article but are ends to be fastened together where the ends extend from an article to which they are attached such as boxes, luggage, etc. or from garments etc. Belt type articles for personal wear or other usage particularly illustrate the invention and will be used to explain it in detail. In general, the belt will be made of flat flexible material desirably of textile character at least at the ends where the fastening action is obtained. Other usable material includes plastic, synthetic fibrous material, leather, etc. The textile may be fabric of any character.

The ends are secured together by having at least one of them provided with a limited localized area carrying pressure sensitive material which in contact with the other end will under finger or similar pressure form a securably tight joint that may be released by tension pulling the ends apart. No other locking or securing means is necessary. For most purposes it is desirable to have a pressure sensitive area on each contacting end or similar part so that pressing the elements together gives a secure but separable joint.

The pressure sensitive area is desirably produced by applying thereto a pressure sensitive composition tacky or non-tacky at the area desired. Such compositions may be in the form of plastic or other material applied directly to the end or ends to be secured together; or the composition may be spread on a separate tab and the latter stitched or pinned or otherwise attached to the belt or similar structure; use may be made of any of these materials in sheet or film form type or may be cut to size and applied to the ends.

Any type of composition that is pressure sensitive may be used. There are a great many such compositions available on the market illustrated by pressure sensitive tacky and non-tacky silicone compositions, rubber compositions both partially vulcanized and unvulcanized, and various other resin and polymeric materials, both natural like latex and synthetic like polyvinyl that may be used. The so-called fusible silicone rubbers illustrate excellent material to be used.

Since the fusible silicone rubber can be obtained on the market in several different modifications, it is readily available for employment for the purposes set forth herein. Such fusible silicone rubbers are pressure sensitive and the surfaces adhere to themselves or to other silicone rubbers. The adhesive quality is built into the fusible silicone rubber and may be controlled without sacrifice of processing or other desirable properties. The fusible silicone rubbers are obtainable in grades so that under pressure they will adhere adequately but may nevertheless be separated, the bond not being permanent. On the other hand, they are also obtainable so that once pressure fused together, a permanent bond is obtained. They thus exhibit a great variety of properties for use in the present invention. As exemplary of commercially available fusible silicone rubber mention may be made of Union Carbide "K-1605R" and "K-1605RS." Such materials may be used for any of the purposes set forth herein. The fusible silicone rubbers may be applied as a coating or deposit or may be formulated into sheet or other forms and employed in that condition.

In lieu of silicone rubber, the present invention may make use of any type of sheet material which on pressure contact adheres together securely. Uncured rubber sheets may be used in this way. Where the pressure sensitive sheet materials after pressure contact are separable, a temporary joint is secured. Where the joint is not separable, a permanent joint is obtained.

Referring to the forms of the invention illustrated in the drawings, FIGURES 1 to 4 illustrate the invention where the pressure sensitive material is in the form of intermeshing corrugations of rubber composition. Belt 1 of flat flexible fabric has end portions 2, 3 adapted to contact each other. Each end portion carries a piece of corrugated rubber sheeting 4, 5. That on end portion 2 is shown of substantially lesser length than the corrugated material on end portion 3. This of course is to enable the end portions to be contacted to vary the length of the belt. Each corrugated element is cemented to its corresponding end portion of the belt so that they may contact. A U-shaped clip, 6, having in-turned ends 7, 8 has sliding contact over the adjacent end portions 2, 3 to hold them in pressure contact. If the corrugated sheeting portions 4, 5 are pressure sensitive as desirably used here and made of tacky composition preferably for that purpose, they will form a joint upon contacting them under for example finger pressure. The clip may be used for added pressure and protection, but is not essential. If however non-pressure sensitive material is used for the corrugated sheeting, the belt may still be used for normal belt purposes by means of the clip.

In the form particularly illustrated in FIGURE 4, the intercommunicating sheeting 4, 5 has a series of projections 9, 10 to form the corrugations. They may take any desired form that will give the desired function. The sheeting is attached by cement 11 to end portions 2, 3 respectively. While rubber sheeting carrying corrugations has been indicated above, other material such as tacky silicone rubber may be used. And actually the end portions 12 only of the corrugations need be tacky or otherwise pressure-sensitive while the base portions 13 are of non-pressure sensitive material. And as shown in FIGURE 4, the pressure sensitive material need not be used on more than one set of corrugations or only one part thereof.

With respect to the corrugated configuration, this arrangement provides several distinct advantages:

(1) It provides additional contact surface area. For example, a flat belt with a contact surface measure 3" long by 1" wide, has a total of three square inches of contact area. Corrugation adds surface area, for example:

(2) By corrugating the surface, with triangular mounds, measuring ⅛" high by ¼" width at the base, a total contact area of 4⅜" is obtained, over ⅓ more than the flat strip.

(3) In addition, any sideway tug of the belt would cause the intermeshing corrugations to press firmly at the sides of the corrugation. Since pressure-sensitive and self-adhering rubbers, etc., depend, to a degree, upon pressures for their binding strength, a greater adhesion is effected.

(4) The intermeshing corrugations tend to provide a scraping and cleaning effect upon their surfaces, due to the sliding motion of the surfaces, as they contact and scrape over one another. This is particularly true if the upper corrugations are slightly wider than the lower. In addition, this sliding and scraping motion tends to roughen the surfaces, which is important in effecting a greater bond, whereas, in a flat belt, the downward pressure tends to smooth out the surface.

(5) Furthermore, there is a mechanical assist in preventing the two surfaces from separating when the upper and lower surfaces are pulled in opposite directions— as happens when the belt is worn.

Considering now the form shown in FIGURES 5 to 7 of the drawing, two belt end portions 21, 22 desirably of textile, but any other flat flexible material may be used as explained above. End portion 21 is shown having a buckle member 23. The latter is desirably annular and has a central cross-pin 24 about which end portion 21 is turned on itself and secured in position, about pin 24 by stitching or cement or in any other way. Each end portion 21, 22 is provided with a sheet portion that is pressure sensitive 25, 26 that will contact each other when loose end portion 22 is threaded through the buckle as shown particularly in FIGURES 6 and 7.

The pressure sensitive area may be formed by use of any of the compositions that are pressure sensitive on contact, as fully explained above. The compositions may be applied directly to end portions 21, 22 or pressure sensitive sheeting may be used. When end portion 22 is drawn through the buckle 23 and pulled taut as illustrated in FIGURES 6 and 7, the end portions will be brought into pressure adhering contact. The buckle may be considered as a form of clip which serves to hold the ends together.

In the form shown in FIGURES 5 to 7, with the buckle as shown, the belt passes up through one side of the buckle-up over the center cross bar or pin portion and down through the opposite side of the buckle. This causes the belt to form a half-loop over the center portion of the buckle. The cross portion may extend upwardly to increase the pressure on the overlying belt end portions.

It is this half loop that is responsible for much of the non-slip feature, as, when the belt is pulled, the half loop tends to flatten down and presses firmly against the surface beneath it; thus two non-slip surfaces are brought into proper contact to prevent any slipping sideways.

With pressure sensitive areas, the pressure may be varied by varying the position of the cross-bar as explained above so that the pressure sensitive areas are kept under pressure at all times. But this pressure may be of a degree so that non-slippage adherence between the belt ends may be obtained with smooth non-self adhering compositions without the pressure sensitive materials mentioned.

This adherent or coherent effect is obtained because with cross-bar or cross-pin 24 in the buckle 23, the belt material is looped through as illustrated in FIGURE 10 and adherence or coherence against slippage may be obtained when in contact even without pressure sensitive areas. The function or effect is heightened with corrugated or embossed or otherwise roughened surface contact on either one belt end or both.

The curvature of the crossbar or crosspin of the belt is particularly important to the non-slip principle. For, as the belt is tightened, the curved portion of the belt around the bar or pin tends to flatten and press down on the material underneath. Because of this pressure, the self-adhering portions come into firm contact and when corrugations or other intermeshing contact areas are used a firm joint is obtained.

Referring now to FIGURES 8 to 10, this form of the invention is similar to that shown in FIGURES 5 to 7, except that the adherent areas are corrugated, embossed or otherwise roughened so that when such areas are used on the ends of both contacting ends, they intermesh. Thus as shown on the drawing the pressure sensitive areas 25 and 26 of FIGURES 5 to 7 are replaced for example by corrugated members 27 and 28. These corrugated elements may be of the form or material discussed in connection with the form shown in FIGURES 1–3. These corrugations of rubber or plastic materials natural or synthetic which are illustrated as acetate or "Mylar" plastic are flexible but not necessarily soft. However any kind of suitable material may be used. While self-adherent materials referred to above as pressure sensitive may be used, they are not necessary. The materials referred to above, acetate and "Mylar," are not pressure sensitive. When used as explained above by interlacing, the belt passes up through one side of the buckle, over the center or cross-bar or cross-pin down through the opposite side of buckle and then below it and outwardly. In use the half-loop flattens down to obtain a very firm non-slip joint.

Having set forth my invention I claim:

1. A flexible band having a buckle member on one end thereof, the buckle having a central cross-pin element on which the band end at the buckle is turned on itself about the pin and secured against release therefrom, the band having an exposed corrugated layer on at least one side thereof attached thereto in the buckle area, the other end of the band having an exposed corrugated layer attached thereto and adapted to contact the corrugated layer on the band end secured on the cross-pin of the buckle, the corrugated layers mating upon normal use of the belt to prevent slippage.

2. A band as set forth in claim 1 in which the mating layers are silicone rubber.

3. A band as set forth in claim 1 in which the mating layers are natural rubber.

4. A band as set forth in claim 1 in which the mating layers are polyvinyl resin.

References Cited in the file of this patent

UNITED STATES PATENTS

| | | |
|---|---|---|
| 1,173,998 | Depew | Feb. 29, 1916 |
| 1,222,678 | Savage | Apr. 17, 1917 |
| 1,237,660 | Lakin | Aug. 21, 1917 |
| 1,955,647 | Mix | Apr. 17, 1934 |
| 2,009,325 | Sachs | July 23, 1935 |
| 2,025,886 | Nordstrom | Dec. 31, 1935 |
| 2,461,201 | Ellis | Feb. 8, 1949 |
| 3,027,566 | Ruby | Apr. 3, 1962 |

FOREIGN PATENTS

| | | |
|---|---|---|
| 733,371 | France | July 5, 1932 |
| 1,086,754 | France | Aug. 18, 1954 |